United States Patent
Watanabe et al.

(10) Patent No.: US 9,520,824 B2
(45) Date of Patent: Dec. 13, 2016

(54) INVERTER APPARATUS

(71) Applicant: MITSUBISHI HEAVY INDUSTRIES AUTOMOTIVE THERMAL SYSTEMS CO., LTD., Kiyosu-shi, Aichi (JP)

(72) Inventors: Kyohei Watanabe, Tokyo (JP); Kenichi Aiba, Tokyo (JP); Takayuki Takashige, Tokyo (JP)

(73) Assignee: Mitsubishi Heavy Industries Automotive Thermal Systems Co., Ltd., Kiyosu-shi (JP)

( * ) Notice: Subject to any disclaimer, the term of this patent is extended or adjusted under 35 U.S.C. 154(b) by 171 days.

(21) Appl. No.: 14/347,538

(22) PCT Filed: Oct. 3, 2012

(86) PCT No.: PCT/JP2012/075669
§ 371 (c)(1),
(2) Date: Mar. 26, 2014

(87) PCT Pub. No.: WO2013/051616
PCT Pub. Date: Apr. 11, 2013

(65) Prior Publication Data
US 2014/0232308 A1    Aug. 21, 2014

(30) Foreign Application Priority Data

Oct. 4, 2011  (JP) ................. 2011-220299

(51) Int. Cl.
*H02P 21/00* (2016.01)
*H02P 27/06* (2006.01)
(Continued)

(52) U.S. Cl.
CPC ............ *H02P 27/06* (2013.01); *H02P 27/047* (2013.01); *H02P 27/085* (2013.01); *H02M 2001/0009* (2013.01)

(58) Field of Classification Search
CPC .... H02P 21/0035; H02P 21/06; Y02T 10/643; H02M 5/271
(Continued)

(56) References Cited

U.S. PATENT DOCUMENTS 5,206,575 A * 4/1993 Nakamura ............. H02P 6/002
318/807
6,496,397 B2 * 12/2002 Sakai ...................... H02M 7/48
363/131

(Continued)

FOREIGN PATENT DOCUMENTS

CN       1381944 A    11/2002
CN     101145755 A     3/2008
(Continued)

OTHER PUBLICATIONS

International Search Report dated Dec. 25, 2012 issued in corresponding application No. PCT/JP2012/075669.
(Continued)

*Primary Examiner* — Rina Duda
(74) *Attorney, Agent, or Firm* — Westerman, Hattori, Daniels & Adrian, LLP

(57) ABSTRACT

An object of the present invention is to achieve stable inverter control by means of current detection using one current sensor in all of periods in which overmodulation control is performed. An inverter controller includes a γ-axis current calculation section that holds, in advance, a γ-axis current arithmetic expression including a direct current as a parameter, and calculates a γ-axis current using a direct current detected by a current sensor for the γ-axis current arithmetic expression.

9 Claims, 10 Drawing Sheets

(51) Int. Cl.
*H02P 27/04* (2016.01)
*H02P 27/08* (2006.01)
*H02M 1/00* (2006.01)

(58) Field of Classification Search
USPC ............ 318/800, 801, 807, 811, 599, 400.02
See application file for complete search history.

(56) References Cited

U.S. PATENT DOCUMENTS

| | | | | |
|---|---|---|---|---|
| 6,704,212 | B2* | 3/2004 | Furukawa ......... | H02M 7/53875 363/41 |
| 7,064,514 | B2* | 6/2006 | Iwaji .................. | H02P 21/0039 318/800 |
| 7,548,443 | B2* | 6/2009 | Arisawa ............ | H02M 7/53875 363/132 |
| 2001/0043481 | A1 | 11/2001 | Sakai et al. | |
| 2004/0183498 | A1 | 9/2004 | Iwaji et al. | |
| 2007/0170885 | A1 | 7/2007 | Morimoto et al. | |
| 2008/0061727 | A1 | 3/2008 | Tomigashi | |
| 2011/0309781 | A1 | 12/2011 | Tomigashi | |

FOREIGN PATENT DOCUMENTS

| | | |
|---|---|---|
| CN | 101286727 A | 10/2008 |
| EP | 1 152 520 A2 | 11/2001 |
| EP | 1 898 519 A2 | 3/2008 |
| JP | 8-19263 A | 1/1996 |
| JP | 2003219678 A | 7/2003 |
| JP | 2005045990 A | 2/2005 |
| JP | 2005-210813 A | 8/2005 |
| JP | 2008-67556 A | 3/2008 |
| JP | 2008220117 A | 9/2008 |
| JP | 2010093931 A | 4/2010 |
| JP | 2010206945 A | 9/2010 |
| JP | 2011-4506 A | 1/2011 |
| WO | 2005/088822 A1 | 9/2005 |

OTHER PUBLICATIONS

Written Opinion of the International Searching Authority dated Dec. 25, 2012 issued in corresponding application No. PCT/JP2012/075669.
Chinese Office Action dated Oct. 10, 2015, issued in counterpart Japanese patent application No. 201280047203.5, with English translation. (16 pages).
Chinese Office Action dated Oct. 10, 2015, issued in counterpart Chinese patent application No. 201280047203.5, with English translation. (16 pages).
Extended (supplementary) European Search Report dated Apr. 21, 2016, issued in counterpart European Patent Application No. 12838369.2. (7 pages).
Kai Sun et al., "An overmodulation Method for PWM-Inverter-Fed IPMSM Drive With Single Current Sensor", IEEE Transactions on Industrial Electronics, vol. 57, No. 10, 2010, pp. 3395-3404.
Notification on the Grant of Patent Right for Invention dated Aug. 3, 2016, issued in counterpart Chinese Patent Application No. 201280047203.5, with English translation. (2 pages). Concise Explanation of the Relevance: The Notification on the Grant of Patent Right for Invention has been received.

* cited by examiner

INVERTER APPARATUS

TECHNICAL FIELD

The present invention relates to an inverter apparatus.

BACKGROUND ART

Conventionally, V/f vector control has been known as a motor driving control method using an inverter apparatus (see, for example, PTL 1). Furthermore, in V/f vector control, overmodulation control, which is a control method with a voltage utilization rate set to be no less than 1 has been known (see, for example, PTL 2).

Also, in motor control using an inverter apparatus, it is necessary to detect three phase alternating currents flowing from an inverter to a motor. As a method for detecting the three phase alternating currents, for example, PTL 3 discloses a method in which three phase alternating currents are detected by one current sensor provided on the input side of an inverter. More specifically, PTL 3 discloses a technique in which using the phenomenon that two-phase current information appears in a direct current for a PWM inverter by turning on/off switching elements for respective phases included in the inverter, a sampled direct-current input current is distributed to the respective phases based on information on the on/off of the switching elements and the distributed currents are detected as detected current values of the three phases.

CITATION LIST

Patent Literature

{PTL 1}
Japanese Unexamined Patent Application, Publication No. 2005-210813
{PTL 2}
Japanese Unexamined Patent Application, Publication No. 2010-093931
{PTL 3}
Japanese Unexamined Patent Application, Publication No. 2008-220117

SUMMARY OF INVENTION

Technical Problem

However, for example, in overmodulation control such as disclosed in PTL 2 above, control may be performed so that, from among switching elements in a lower-side arm included in an inverter, a switching element for one phase is kept on over a period equal to or exceeding one control cycle and switching elements for two phases are kept off (see, for example, FIG. 7). Meanwhile, in the motor current detection method disclosed in PTL 3 above, the phenomenon that two-phase current information appears in a direct current as a result of turning on/off the switching elements is used. Thus, occurrence of current change by switching within one control cycle is a requirement for current detection.

Accordingly, for example, if a switching state such as illustrated in FIG. 7 during overmodulation control being performed, current detection using the technique disclosed in PTL 3 cannot be performed, causing the problem of failure to achieve stable inverter control.

An object of the present invention is to provide an inverter apparatus that can achieve stable inverter control by means of current detection using one current sensor over all of periods in which overmodulation control is performed.

Solution to Problem

A first aspect of the present invention provides an inverter apparatus including: an inverter that converts a direct-current voltage input via a direct-current bus into three phase alternating voltages and outputs the three phase alternating voltages to a motor; an inverter control unit that controls the inverter; and a current detection unit that detects the direct current flowing in the direct-current bus, wherein the inverter control unit includes a first current calculation section that holds, in advance, a $\gamma$-axis current arithmetic expression including the direct current as a parameter, and calculates a $\gamma$-axis current using the direct current detected by the current detection unit for the $\gamma$-axis current arithmetic expression.

In the above configuration, the $\gamma$-axis current calculation section holds, in advance, an arithmetic expression for calculating a $\gamma$-axis current, the arithmetic expression including a direct current as a parameter, and a $\gamma$-axis current is calculated using the arithmetic expression, and thus, if a direct current can be detected, a $\gamma$-axis current can be figured out. Consequently, even if only one current sensor is provided, a $\gamma$-axis current can be figured out in all of periods in which overmodulation control is performed.

Examples of the parameter for a direct current include parameters relating to a direct current, each parameter being set using the direct current, such as an average direct current figured out by performing processing for averaging the direct current.

In the inverter apparatus, the $\gamma$-axis current arithmetic expression is, for example, an expression obtained by figuring out a relationship between an average direct current and the $\gamma$-axis current relative to a motor torque when a line voltage and a rotating shaft speed of a motor are changed, respectively, and deriving the expression from the relationship.

In the inverter apparatus, it is possible that the inverter control unit includes a second current calculation section that calculates three phase alternating currents from the direct current detected by the current detection unit and calculates a $\delta$-axis current from the three phase alternating currents.

In the inverter apparatus, it is possible that: the inverter control unit includes a V/f control section to which the $\gamma$-axis current calculated by the first current calculation section and the $\delta$-axis current calculated by the second current calculation section are input; and the V/f control section includes a power supply frequency command calculation section that calculates a power supply frequency command using the $\gamma$-axis current and a speed command for the motor, a $\gamma$-axis voltage command calculation section that calculates a $\gamma$-axis voltage command using an arithmetic expression including an integral term of the $\delta$-axis current and the power supply frequency command as parameters, and a $\delta$-axis voltage command calculation section that calculates a $\delta$-axis voltage command using a linear function of the $\delta$-axis current.

In the inverter apparatus, it is possible that the second current calculation section calculates the $\delta$-axis current from the three phase alternating currents in a first period in which a duty cycle is neither 100% nor 0% in one electrical angle cycle during overmodulation control being performed, and keeps the $\delta$-axis current calculated last time in the first period and outputs the kept value as the $\delta$-axis current in a period other than the first period.

As described above, in a period other than the first period, the second current calculation section outputs a last value held by the second current calculation section without performing calculation processing, enabling reduction in processing load and power consumption.

Here, "first period" refers to a period that is equal to or lower than an upper limit of a duty cycle that enables an inverter controller (for example, a CPU) to secure time necessary for detecting a current value and is equal to or higher than a lower limit of the duty cycle that enables the inverter controller to secure time necessary for detecting a current value.

In the inverter apparatus, it is possible that in a period in which a duty cycle is either 100% or 0% in one electrical angle cycle during overmodulation control being performed, the second current calculation section halts processing for calculating the δ-axis current, and the γ-axis voltage command calculation section calculates the γ-axis voltage command using a fixed value set in advance in the integral term of the δ-axis current.

As described above, in a period that a duty cycle is either 100% or 0% in one electrical angle cycle during overmodulation control being performed, the processing for calculating the δ-axis current is halted and processing for calculating the integral term of the δ-axis current in the V/f control section is also halted, enabling simplification of the arithmetic processing, whereby a processing load on the inverter control unit can be reduced.

In the inverter apparatus, it is possible that during overmodulation control being performed, the δ-axis voltage command calculation section outputs a fixed value set in advance as the δ-axis voltage command.

As described above, during overmodulation control being performed, processing for calculating the δ-axis voltage command in the V/f control section is halted, enabling simplification of the arithmetic processing, whereby the processing load on the inverter control unit can be reduced.

In the inverter apparatus, it is possible that the inverter control unit includes: a V/f control section to which the γ-axis current calculated by the first current calculation section is input, the V/f control section calculating a power supply frequency command using the γ-axis current and a speed command for the motor; and a third current calculation section that holds, in advance, a δ-axis current arithmetic expression including a line voltage and the power supply frequency command calculated in the V/f control section as parameters, and calculates a δ-axis current using an command value or a measurement value of the line voltage and the power supply frequency command calculated by the V/f control section for the δ-axis current arithmetic expression.

In the above configuration, the third current calculation section holds, in advance, an arithmetic expression for calculating a δ-axis current, and calculates the δ-axis current using the arithmetic expression. Consequently, even if only one current sensor is provided, a δ-axis current can be figured out in all of periods in which overmodulation control is performed.

In the inverter apparatus, the δ-axis current arithmetic expression is, for example, an expression obtained by figuring out a relationship between the δ-axis current and a motor torque when the line voltage and a rotating shaft speed of the motor are changed, respectively, and deriving the expression from the relationship.

It is possible that: the inverter apparatus includes a fourth current calculation section that calculates three phase alternating currents from the direct current detected by the current detection unit, and calculates a γ-axis current from the three phase alternating currents, and a second current calculation section that calculates a δ-axis current from the calculated three phase alternating currents; and in a period in which overmodulation control is performed, the γ-axis current is calculated by the first current calculation section and the δ-axis current is calculated by the third current calculation section, and in a period in which the overmodulation control is not performed, the γ-axis current is calculated by the fourth current calculation section and the δ-axis current is calculated by the second current calculation section.

In the inverter apparatus, it is possible that in a first period in which a duty cycle is neither 100% nor 0% in one electrical angle cycle during overmodulation control being performed, the γ-axis current is calculated by the fourth current calculation section and the δ-axis current is calculated by the second current calculation section, and in a period other than the first period, the γ-axis current is calculated by the first current calculation section and the δ-axis current is calculated by the third current calculation section.

Advantageous Effects of Invention

The present invention provides the advantageous effect of being able to achieve stable inverter control by means of current detection using one current sensor in all of periods in which overmodulation control is performed.

DESCRIPTION OF EMBODIMENTS

An embodiment for a case where an inverter apparatus according to the present invention is employed for a compressor motor used in an in-vehicle air conditioner will be described below with reference to the drawings. The inverter apparatus according to the present invention can be applied not only to a compressor motor, which will be described below, but also widely to any of motors in general.

First Embodiment

Figure 1:
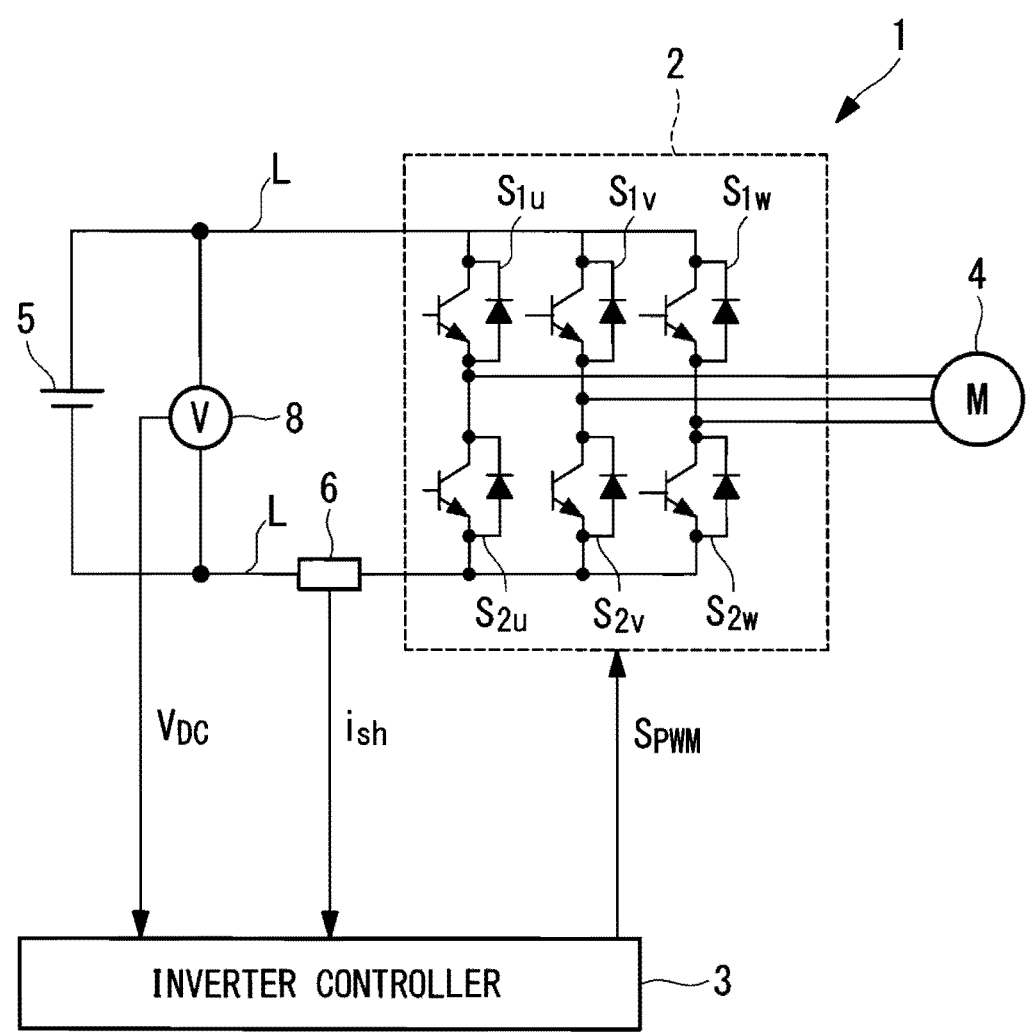
FIG. 1 is a diagram illustrating a schematic configuration of an inverter apparatus according to a first embodiment of the present invention.

FIG. 1 is a diagram illustrating a schematic diagram of an inverter apparatus according to a first embodiment of the present invention. As illustrated in FIG. 1, an inverter apparatus 1 includes an inverter 2 that converts a direct-current voltage $V_{DC}$ input from a direct-current power supply 5 via a direct-current bus L into three phase alternating voltages and outputs the three phase alternating voltages to a compressor motor 4, and an inverter controller 3 that controls the inverter 2.

The inverter 2 includes switching elements $S_{1u}$, $S_{1v}$, $S_{1w}$ in an upper arm and switching elements $S_{2u}$, $S_{2v}$, $S_{2w}$ in a lower arm, which are provided for respective phases, and these switching elements are controlled by the inverter controller 3, thereby generating three phase alternating voltages supplied to the compressor motor 4.

Also, the inverter apparatus 1 includes a current sensor (current detection unit) 6 for detecting a direct current $i_{sh}$ flowing in the direct-current bus L, and a voltage sensor 8 that detects an input direct-current voltage $V_{DC}$ for the inverter 2.

The direct current $i_{sh}$ detected by the current sensor 6 and the direct-current voltage $V_{DC}$ detected by the voltage sensor 8 are input to the inverter controller 3. Here, as an example of the current sensor 6, a shunt resistance may be employed. Also, although the current sensor 6 is provided on the negative side of the direct-current power supply 5 in FIG. 1, the current sensor 6 may be provided on the positive side.

The inverter controller 3 is, for example, an MPU (micro processing unit), and includes a computer-readable recording medium in which a program for performing respective processes described below are recorded, and upon a CPU reading the program recorded in the recording medium onto a main memory unit such as a RAM and executing the program, the respective processes below are performed. Examples of the computer-readable recording medium include, e.g., magnetic disks, magneto optical disks and semiconductor memories.

The inverter controller 3 generates a PWM signal $S_{PWM}$ for making a rotation speed of the compressor motor 4 meet a motor speed command provided from an upper-level controller (illustration omitted), for each of the phases, and provides these PWM signals $S_{PWM}$ to the switching elements for the respective phases in the inverter 2, thereby controlling the inverter 2 to supply desired three phase alternating voltages to the compressor motor 4.

Figure 2:
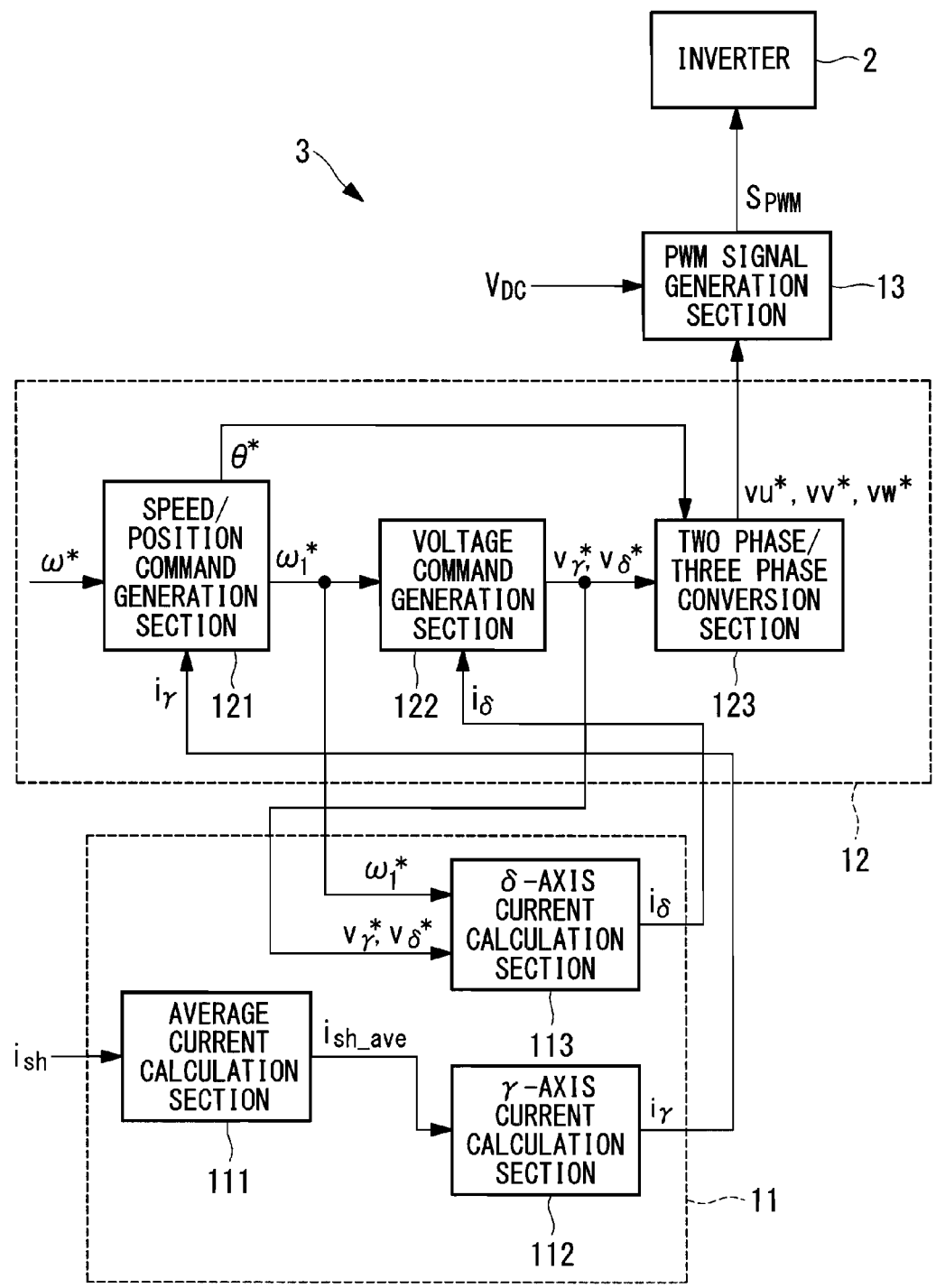
FIG. 2 is a functional block diagram illustrating functions included in the inverter controller illustrated in FIG. 1 in a developed state.

FIG. 2 is a functional block diagram illustrating functions included in the inverter controller 3 in a developed state.

As illustrated in FIG. 2, the inverter controller 3 includes a current calculation section 11, a V/f control section 12 and a PWM signal generation section 13.

The current calculation section 11 includes an average current calculation section 111, a γ-axis current calculation section (first current calculation section) 112 and a δ-axis current calculation section (third current calculation section) 113.

The average current calculation section 111 averages the direct current $i_{sh}$ detected by the current sensor 6 in a predetermined sampling cycle to calculate an average direct current $i_{sh\_ave}$. The average current calculation section 111 averages, for example, the direct current $i_{sh}$ in a cycle of an electrical angle of 60° of a current of any of the phases to obtain the average direct current $i_{sh\_ave}$. The averaging of the direct current $i_{sh}$ is not necessarily required and may be omitted if speed fluctuations and vibration are small enough to cause no problem during the motor being driven. In this case, in the later-described γ-axis current calculation, a γ-axis current $i_\gamma$ is calculated using a direct current $i_{sh}$ instead of the average direct current $i_{sh\_ave}$.

The γ-axis current calculation section 112 holds, in advance, a γ-axis current arithmetic expression including an average direct current $i_{sh\_ave}$ as a parameter, and substitutes the average direct current $i_{sh\_ave}$ calculated by the average current calculation section 111 into the γ-axis current arithmetic expression to calculate the γ-axis current $i_\gamma$.

The δ-axis current calculation section 113 holds, in advance, a δ-axis current arithmetic expression including a line voltage command effective value $V_{rms}$ as a parameter. Here, the line voltage command effective value $V_{rms}$ is a value determined from on a power supply frequency command $\omega_1^*$ and two phase voltage commands $v_\gamma^*$ and $v_\delta^*$ used in the later-described V/f control section 12. The δ-axis current calculation section 113 uses the line voltage command effective value $V_{rms}$ determined from the power supply frequency command $\omega_1^*$ and the two phase voltage commands $v_\gamma^*$ and $v_\delta^*$ calculated by the V/f control section 12 for the δ-axis current arithmetic expression to calculate a δ-axis current $i_\delta$.

The line voltage command effective value $V_{rms}$ can be calculated according the following expression.

$$V_{rms} = \sqrt{(v_\delta^{*2} + v_\gamma^{*2})}$$

Here, the γ-axis current and the δ-axis current are currents for respective axes, which are set using a δ-γ coordinate system. The δ-γ coordinate system is formed by inverter axes (γ-axis and δ-axis) for driving the motor with neither detection nor estimation of a position of a rotor, and corresponds to a d-q coordinate system in which a d-axis is set in a direction of a magnetic flux in the position of the rotor in the motor and a q-axis is set in a direction perpendicular to the d-axis.

For calculation of the δ-axis current $i_\delta$, an actual line voltage effective value (measurement value) may be used instead of the line voltage command effective value $V_{rms}$. Also, although in the above example, the line voltage command effective value is calculated from the two phase voltage commands $v_\gamma^*$ and $v_\delta^*$, the line voltage command effective value may be calculated from three phase voltage commands.

Details of the γ-axis current arithmetic expression held by the γ-axis current calculation section 112 and the δ-axis current arithmetic expression held by the δ-axis current calculation section 113 will be described later.

The V/f control section 12 includes a speed/position command generation section 121, a voltage command generation section 122 and two phase/three phase conversion section 123.

The speed/position command generation section 121 calculates a power supply frequency command (angular frequency command for three phase alternating voltages supplied to the compressor motor 4) $\omega_1^*$ using a rotating shaft speed command $\omega_m^*$ for the compressor motor 4 and the γ-axis current $i_\gamma$ calculated by the γ-axis current calculation section 112.

The power supply frequency command $\omega_1^*$ can be calculated using, for example, Expression (1) below.

$$\omega_1^* = n\omega_m^* - K_\omega i_\gamma \quad (1)$$

In Expression (1), n is a number of pole pairs, $\omega_m^*$ is a rotating shaft speed command for a motor, and $K_\omega$ is a frequency control gain, which is a positive constant.

According to Expression (1), if the γ-axis current $i_\gamma$ increases, that is, if a motor load increases, the power supply frequency command $\omega_1^*$ is decreased. Meanwhile, if the γ-axis current $i_\gamma$ decreases, that is, if the motor load decreases, the power supply frequency command $\omega_1^*$ is increased. As a result of the control being performed in such a manner as described above, if the motor load increases, the power supply frequency command $\omega_1^*$ is decreased, enabling stall prevention, and if the motor load decreases, the power supply frequency command $\omega_1^*$ is increased, enabling suppression of acceleration of the motor.

Furthermore, the speed/position command generation section 121 integrates the power supply frequency command $\omega_1^*$ to calculate a rotor position command θ*. An expression for calculation of the rotor position command θ* is provided as Expression (2) below.

$$\theta^* = \int \omega_1^* dt \quad (2)$$

The voltage command generation section 122 calculates a γ-axis voltage command $v_\gamma^*$ from Expression (3) below and a δ-axis voltage command $v_\delta^*$ from Expression (4) below.

$$v_\gamma^* = \Lambda_\delta^* \omega_1^* + V_{ofs\gamma} \quad (3)$$

$$v_\delta^* = -K_\delta i_\delta \quad (4)$$

In Expression (3), $\Lambda_\delta^*$ is an induced voltage coefficient (reverse voltage coefficient) for the compressor motor 5, and $V_{ofs\gamma}$ is an offset voltage, which can be figured out according to Expression (5) below. Also, in Expression (4), $K_\delta$ is a δ-axis current control gain, which is a positive constant.

$$V_{ofs\gamma} = -K_d \int i_\delta dt \quad (5)$$

In Expression (5) above, $K_d$ is a voltage adjustment gain, which is a positive constant.

The two phase/three phase conversion section 123 calculates three phase voltage commands $v_u^*$, $v_v^*$ and $v_w^*$ from the γ-axis voltage command $v_\gamma^*$ and the δ-axis voltage command $v_\delta^*$ calculated in the voltage command generation section 122, using the rotor position command θ*.

The PWM signal generation section 13 generates PWM signals $S_{PWM}$ for the respective phases, using the three phase voltage commands $v_u^*$, $v_v^*$ and $v_w^*$ calculated by the V/f control section 12. Also, for generation of the PWM signals $S_{PWM}$, the direct-current voltage $V_{DC}$ input to the inverter 2 is used.

Next, the γ-axis current arithmetic expression and the δ-axis current arithmetic expression used in the current calculation section 11, which provide one of main characteristics of the present invention, will be described in detail.

The inventors perform simulations to figure out a relationship between the average direct current $i_{sh\_ave}$, and the γ-axis current $i_\gamma$ and the δ-axis current $i_\delta$ relative to a motor torque when the line voltage command effective value and a rotating shaft speed of the motor are changed, respectively.

Figure 3:
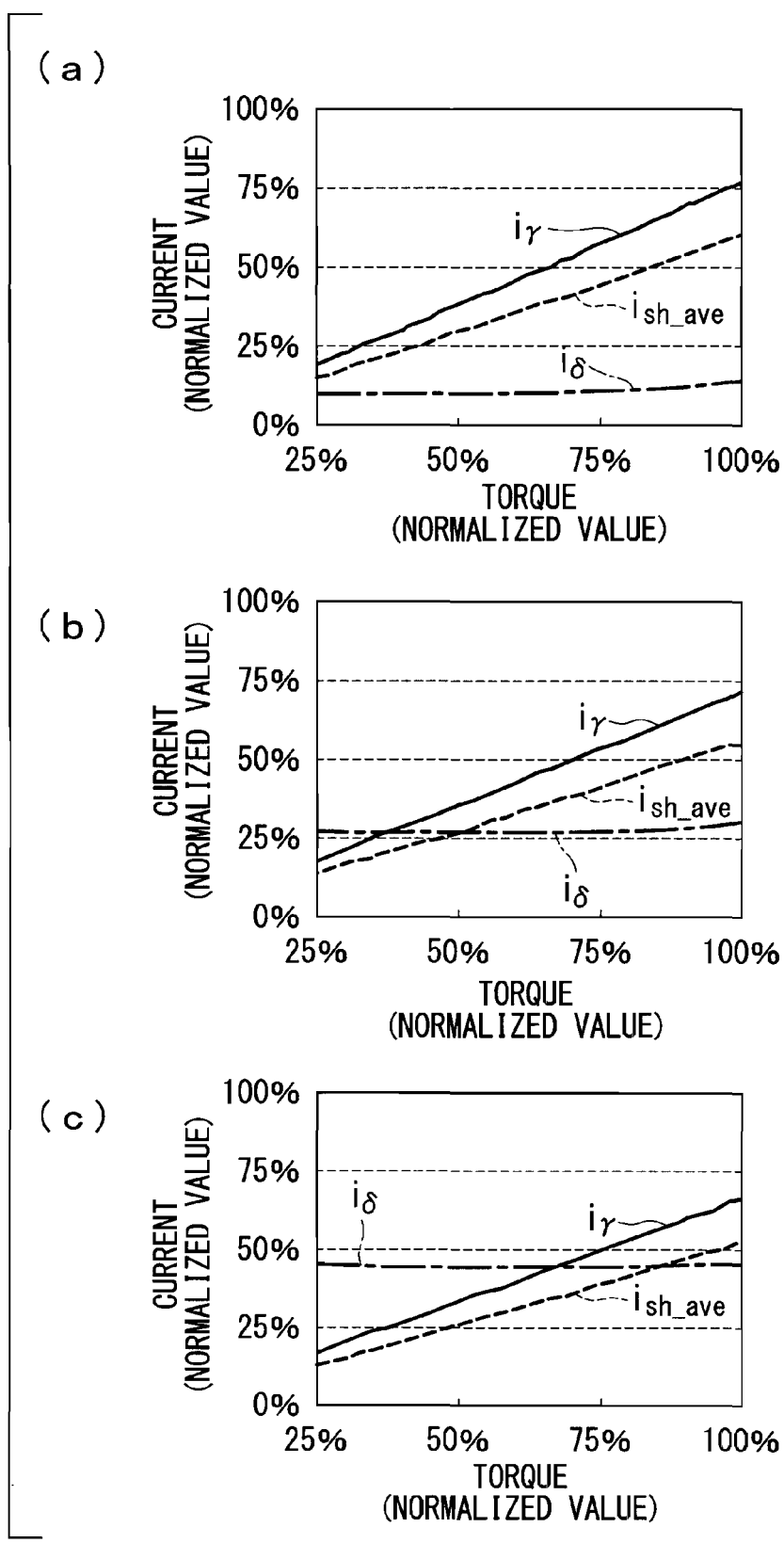
FIG. 3 includes diagrams each illustrating a relationship between an average direct current, and a γ-axis current and a δ-axis current relative to a motor torque when a line voltage command effective value and a rotating shaft speed of a motor are changed, respectively.
Figure 4:
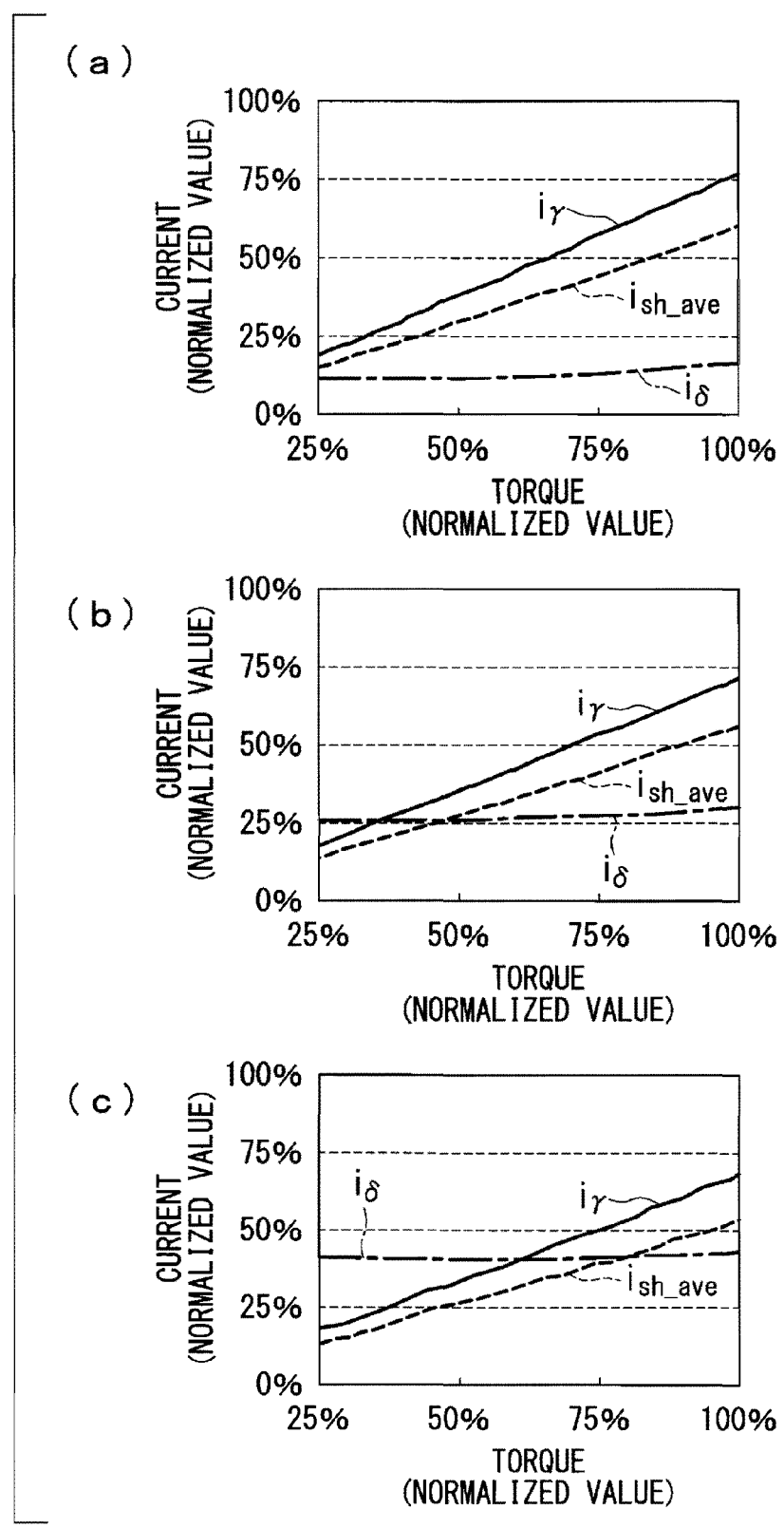
FIG. 4 includes diagrams each illustrating a relationship between an average direct current, and a γ-axis current and a δ-axis current relative to a motor torque when a line voltage command effective value and a rotating shaft speed of a motor are changed, respectively.
Figure 5:
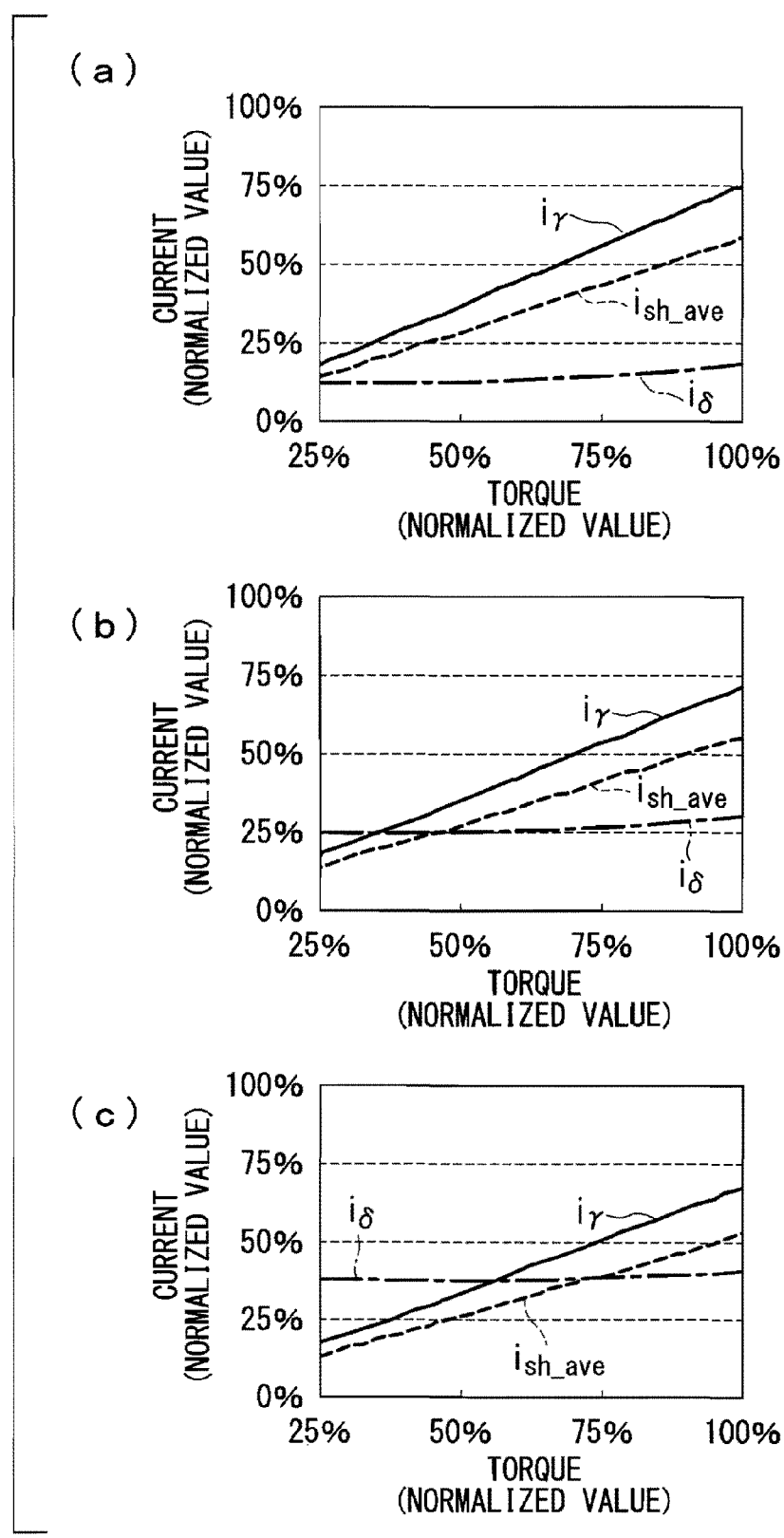
FIG. 5 includes diagrams each illustrating a relationship between an average direct current, and a γ-axis current and a δ-axis current relative to a motor torque when a line voltage command effective value and a rotating shaft speed of a motor are changed, respectively.

FIGS. 3 to 5 illustrate results of the simulations. In each of the graphs in FIGS. 3 to 5, the ordinate axis represents current and the abscissa axis represents motor torque. FIG. 3 indicates results of simulations where the rotating shaft speed of the motor is low, for example, the rotating shaft speed is set to be no less than 70% and less than 80% relative to a maximum rotating shaft speed, FIG. 4 indicates results of simulations where the rotating shaft speed of the motor is medium, for example, the rotating shaft speed is set to be no less than 80% and less than 90% relative to the maximum rotating shaft speed, and FIG. 5 indicates results of simulations where the rotating shaft speed of the motor is high, for example, the rotating shaft speed is set to be no less than 90% and no more than 100% relative to the maximum rotating shaft speed. Also, in FIGS. 3 to 5, the line voltage command effective value is gradually increased in the order of from FIGS. 3(a) to 5(c). The respective characteristics are figured out for respective line voltage command effective values and respective rotating shaft speeds of the motor that may provide overmodulation control depending on the motor torque.

As illustrated in FIGS. 3 to 5, there is a proportional relationship between the γ-axis current $i_\gamma$ and the average direct current $i_{sh\_ave}$, and it was found that the γ-axis current $i_\gamma$ can be expressed by a linear function of the average direct current $i_{sh\_ave}$.

Also, it was found that a proportionality factor (γ-axis current conversion factor Kγ) can be expressed by a constant value irrespective of the rotation speed and the line voltage command effective value. A γ-axis current arithmetic expression derived from the simulation results is indicated as Expression (6).

$$i_\gamma = K_\gamma \times i_{sh\_ave} \quad (6)$$

In Expression (6) above, $K_\gamma$ is a γ-axis current conversion factor, which is a value derived from the simulation results indicated in FIGS. 3 to 5.

Figure 6:
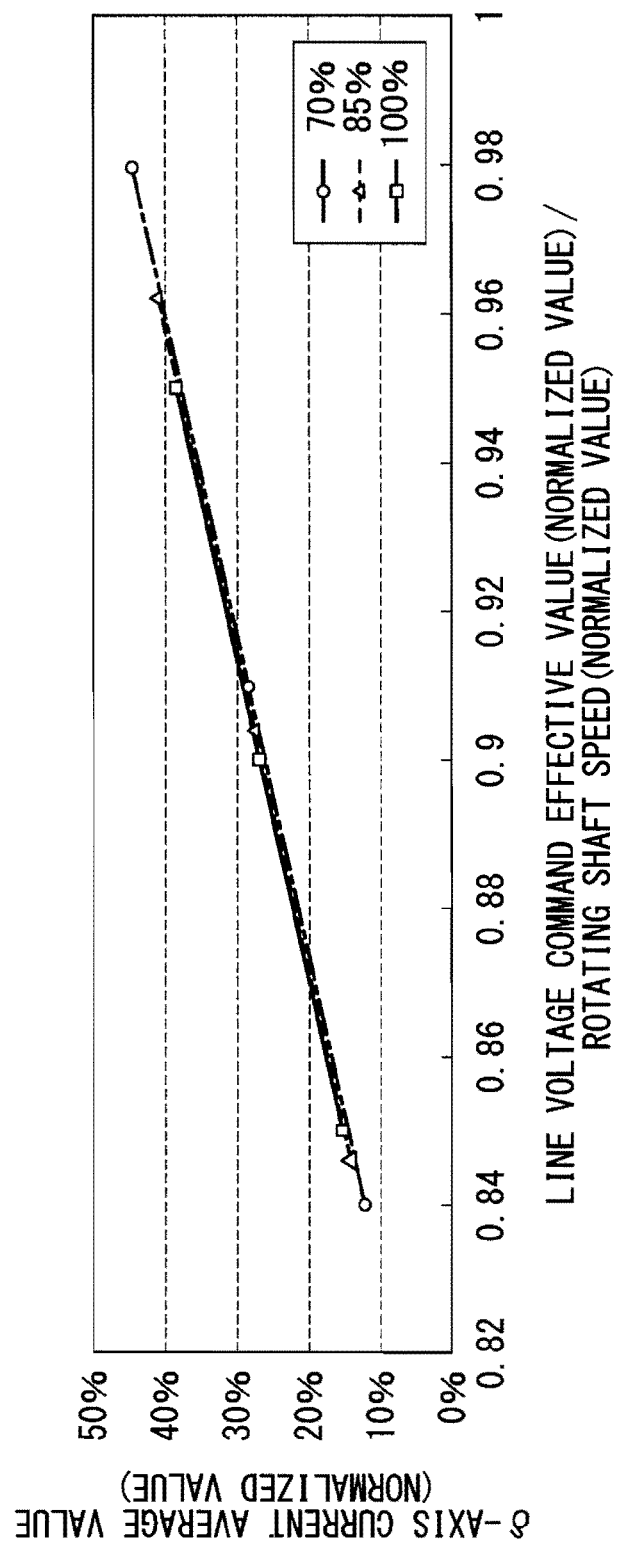
FIG. 6 is a diagram illustrating a relationship between an average value of the δ-axis current obtained from the relationships illustrated in FIGS. 3 to 5, and the line voltage command effective value/the rotating shaft speed of the motor.

As opposed to the γ-axis current $i_\gamma$, it was found that the δ-axis current $i_\delta$ is substantially constant relative to the motor torque and also the δ-axis current $i_\delta$ changes according to the line voltage command effective value and the rotating shaft speed of the motor. Therefore, the inventors plotted an average value of the δ-axis currents in the respective graphs in FIGS. 3 to 5 in a coordinate space with a value obtained as a result of division of the line voltage command effective value by the rotating shaft speed of the motor as the abscissa axis and with the average value of the δ-axis current $i_\delta$ as the ordinate axis, to figure out characteristics for respective rotation speeds (70%, 85% and 100% relative to the maximum shaft speed) such as illustrated in FIG. 6. From FIG. 6, it was found that the average value of the δ-axis current $i_\delta$ can be a linear function of a value obtained as a result of division of the line voltage command effective value by the rotating shaft speed of the motor. A δ-axis current arithmetic expression derived from the simulation results is indicated as Expression (7).

$$i_\delta = K_\delta (V_{rms}/\omega_1^*) + i_{\delta ofs} \quad (7)$$

In Expression (7), $K_\delta$ is a δ-axis current conversion factor, $V_{rms}$ is a line voltage command effective value, $\omega_1^*$ is a power supply frequency command, and $i_{\delta ofs}$ is a δ-axis current offset. Here, the δ-axis current conversion factor $K_\delta$ and the δ-axis current offset $i_{\delta ofs}$ are values that can be derived from the characteristics indicated in FIG. 6. Also, although the rotating shaft speed of the motor is used in FIG. 6, the power supply frequency command is used in Expression (7) instead of the rotating shaft speed of the motor. Reasons for this are that: the power supply frequency command substantially corresponds to the rotating shaft speed of the motor and the arithmetic expression thus holds even if the rotating shaft speed of the motor is substituted with the power supply frequency command; and as described above, the inverter controller 3 uses the power supply frequency command $\omega_1^*$ for V/f control. As described above, the power supply frequency command $\omega_1^*$ calculated for V/f control is used as it is, enabling easy calculation of the δ-axis current.

Next, an operation of the inverter controller 3 according to the present embodiment will be described.

First, a direct current $i_{sh}$ and an input direct-current voltage $v_{DC}$ detected by the current sensor 6 and the voltage sensor 8, respectively, are input to the inverter controller 3. The average current calculation section 111 of the current calculation section 11 in the inverter controller 3 averages the direct current $i_{sh}$ in a predetermined sampling cycle and outputs an average direct current $i_{sh\_ave}$ to the γ-axis current calculation section 112 and the δ-axis current calculation section 113.

The γ-axis current calculation section 112 holds Expression (6) above in advance, and calculates a γ-axis current $i_\gamma$ by substituting the average direct current $i_{sh\_ave}$ input from the average current calculation section 111 into Expression (6).

Also, the δ-axis current calculation section 113 holds Expression (7) in advance, and receives inputs of a latest power supply frequency command $\omega_1^*$, a latest γ-axis voltage command $v_\gamma^*$ and a latest δ-axis voltage command $v_\delta^*$ from the V/f control section 12. The δ-axis current calculation section 113 calculates a line voltage command effective value $V_{rms}$ from the γ-axis voltage command $v_\gamma^*$ and the δ-axis voltage command $v_\delta^*$. Furthermore, the δ-axis current calculation section 113 calculates a δ-axis current $i_\delta$ by substituting the line voltage command effective value $V_{rms}$ and the input power supply frequency command $\omega_1^*$ into Expression (7) above.

The γ-axis current $i_\gamma$ calculated by the γ-axis current calculation section 112 and the δ-axis current $i_\delta$ calculated by the δ-axis current calculation section 113 are input to the V/f control section 12 and used for generation of three phase voltage commands.

More specifically, in the speed/position command generation section 121 in the V/f control section 12, the γ-axis current $i_\gamma$ is substituted into Expression (1) above to calculate a power supply frequency command $\omega_1^*$. Furthermore, the power supply frequency command is integrated to calculate a rotor position command $\theta^*$.

Subsequently, in the voltage command generation section 122, a γ-axis voltage command $v_\gamma^*$ and a δ-axis voltage command $v_\delta^*$ are calculated according to Expressions (3) and (4), using the power supply frequency command $\omega_1^*$ and the δ-axis current $i_\delta$.

In the two phase/three phase conversion section 123, the γ-axis voltage command $v_\gamma^*$ and the δ-axis voltage command $v_\delta^*$ calculated in the voltage command generation section 122 into three phase voltage commands $v_u^*$, $v_v^*$ and $v_w^*$, using the rotor position command $\theta^*$ calculated in the speed/position command generation section 121.

The three phase voltage commands $v_u^*$, $v_v^*$ and $v_w^*$ calculated in the V/f control section 12 are input to the PWM signal generation section 13 and used together with a value of the input direct-current voltage $V_{DC}$ input to the inverter 2, for generation of PWM signals $S_{PWM}$ for the respective phases. The PWM signals for the respective phases, which have been generated by the PWM signal generation section 13, are provided to the inverter 2, and control to turn on/off the switching elements in the upper and lower arms for the respective phases in the inverter 2 is performed based on the respective PWM signals.

Figure 7:
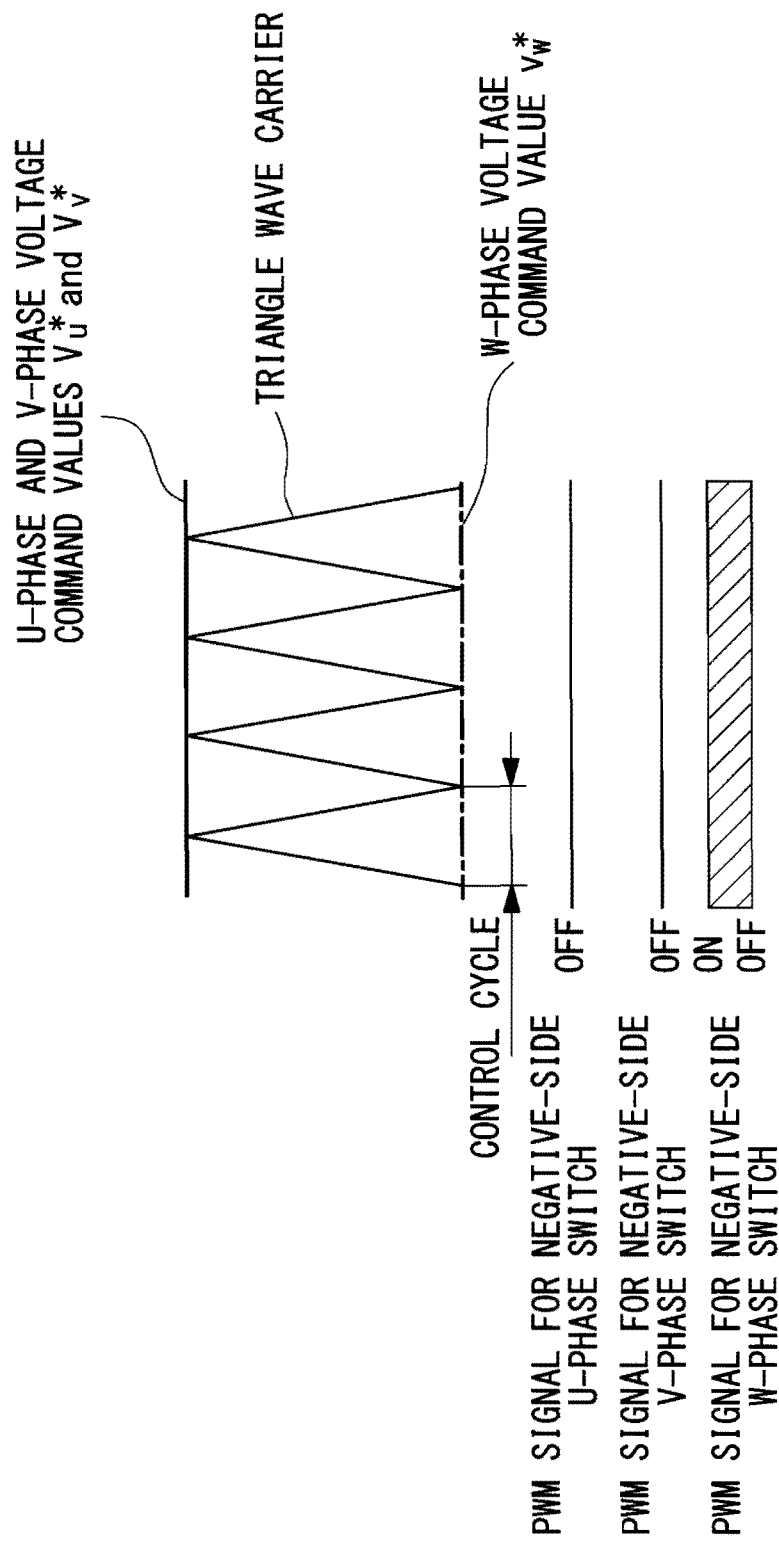
FIG. 7 is a diagram illustrating an example of PWM signals of U-phase, V-phase and W-phase negative-side switches at the time of overmodulation control.

As described above, with the inverter apparatus 1 according to the present embodiment, relationships among an average direct current, a γ-axis current and a δ-axis current relative to a motor torque when a line voltage command effective value and a rotating shaft speed of a motor are changed, respectively, is figured out, and respective arithmetic expressions for calculating the γ-axis current $i_\gamma$ and δ-axis current $i_\delta$ are determined from the relationships, and the γ-axis current $i_\gamma$ and the δ-axis current $i_\delta$ are calculated using the arithmetic expressions. Consequently, as indicated in FIG. 7, even if overmodulation control in which only the switching elements for one phase (W-phase in FIG. 7) are kept in an on state and the switching elements for the remaining two phases are kept in an off state over a period equal to or exceeding one control cycle is performed, a γ-axis current $i_\gamma$ and a δ-axis current $i_\delta$ can be figured out based on a direct current $i_{sh}$ detected by the current sensor 6.

Furthermore, with the inverter apparatus 1 according to the present embodiment, the γ-axis current $i_\gamma$ is calculated from an average direct current $i_{sh\_ave}$ and the δ-axis current $i_\delta$ is calculated using a parameter used for V/f control. Accordingly, for example, the step of calculating inverter output currents iu, iv and iw, which is described in, e.g., PTL 3, can be omitted. Consequently, a processing load on the inverter controller 3 can be reduced. As a result, the inverter controller 3 has a capacity in processing, enabling, for example, reduction in control cycle and/or an increase in carrier frequency.

In the present embodiment, the configuration of the V/f control section 12 is a mere example, and besides the above-described configuration, any of known V/f control configurations, for example, a V/f control configuration such as disclosed in PTL 1, can be employed.

Furthermore, beside the V/f control section 12, the inverter controller 3 may include one or more control sections that control the inverter using other control methods such as sensorless vector control, open-loop control and fixed-frequency PWM control. For example, it is possible that: one control method is selected from open-loop control, fixed-frequency PWM control, sensorless vector control and V/f control according to a speed command for the compressor motor 4; and the inverter 2 is controlled according to the control method. In this case, it is possible that only during a period in which V/f control is performed, a γ-axis current $i_\gamma$ and a δ-axis current $i_\delta$ are calculated by the current calculation section 11 as described above to perform V/f control based on the calculated γ-axis current $i_\gamma$ and δ-axis current $i_\delta$.

Second Embodiment

Next, an inverter apparatus according to a second embodiment of the present invention will be described. In the above-described inverter apparatus 1 according to the first embodiment, irrespective of whether or not overmodulation control is performed, in a period in which V/f control is performed by the V/f control section 12, a γ-axis current $i_\gamma$ and a δ-axis current $i_\delta$ are calculated by the current calculation section 11 to use the calculated γ-axis current $i_\gamma$ and δ-axis current $i_\delta$ for V/f control. In the inverter apparatus according to the present embodiment, only in a period in which overmodulation control is performed in V/f control, a γ-axis current $i_\gamma$ and a δ-axis current $i_\delta$ are calculated by a current calculation section 11, and in a period in which overmodulation control is not performed, the γ-axis current $i_\gamma$ and the δ-axis current $i_\delta$ are calculated using another axis current calculation procedure.

Figure 8:
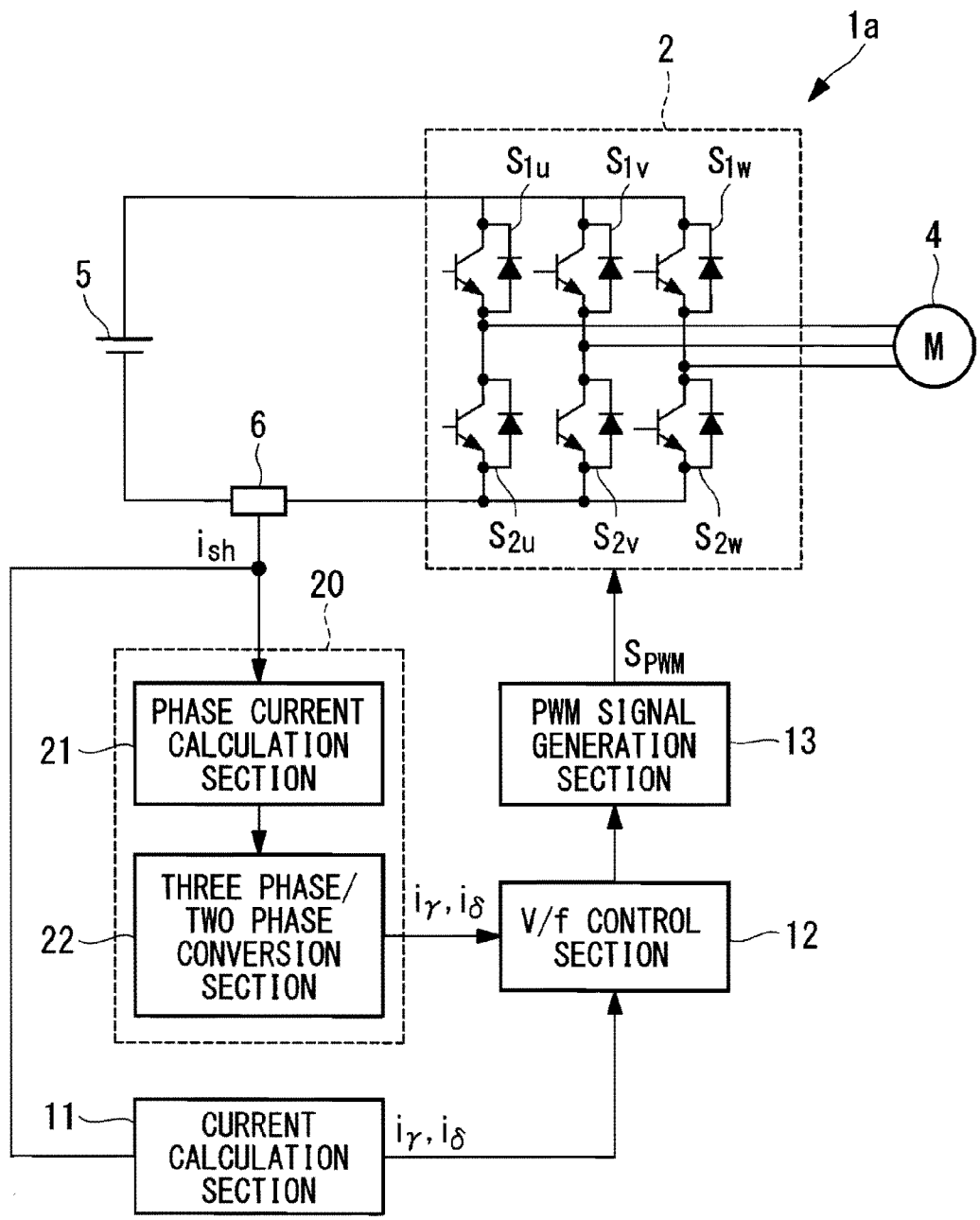
FIG. 8 is a block diagram illustrating a schematic configuration of an inverter apparatus according to a second embodiment of the present invention.

For example, as illustrated in FIG. 8, an inverter apparatus 1a according to the present embodiment includes a current calculation section (a third current calculation section and a fourth current calculation section) 20 that performs the method disclosed in PTL 3, that is, calculates three phase currents $i_u$, $i_v$ and $i_w$ from a direct current $i_{sh}$, and calculates a γ-axis current $i_γ$ and a δ-axis current $i_δ$ from the calculated three phase currents $i_u$, $i_v$ and $i_w$, in addition to the current calculation section 11.

More specifically, the current calculation section 20 includes a phase current calculation section 21 and a three phase/two phase conversion section 22.

In such inverter apparatus 1a, if overmodulation control is performed, a γ-axis current $i_γ$ and a δ-axis current $i_δ$ are calculated using the current calculation section 11, and if overmodulation control is not performed, the γ-axis current $i_γ$ and the δ-axis current $i_δ$ are calculated using the current calculation section 20.

Here, whether or not overmodulation control is being performed may be determined based on, for example, a voltage utilization rate. The voltage utilization rate can be provided according to Expression (8) below.

Voltage utilization rate=line voltage command effective value/(direct-current voltage/√2)     (8)

In this case, if the voltage utilization rate is equal to or exceeds a predetermined value (for example, 1), which is set in advance, it is determined that overmodulation control is being performed and the current calculation section 11 is employed, and if the voltage utilization rate is less than the predetermined value, it is determined that overmodulation control is not being performed and the current calculation section 20 is employed.

Also, besides the determination according to the voltage utilization rate, for example, it is possible that if only negative-side switching elements for one or two phases are kept on over a period equal to exceeding one control cycle and negative-side switching elements for the remaining phases are kept off, the current calculation section 11 is employed, and in cases other than the above, the current calculation section 20 is employed. Whether or not only the negative-side switching elements for one or two phases are kept on and the negative-side switching elements for the remaining phases are kept off can be determined by, for example, determining whether or not any of three voltage commands $v_u^*$, $v_v^*$ and $v_w^*$ calculated by the V/f control section 12 exceeds a maximum value of a triangle wave carrier amplitude.

Figure 9:
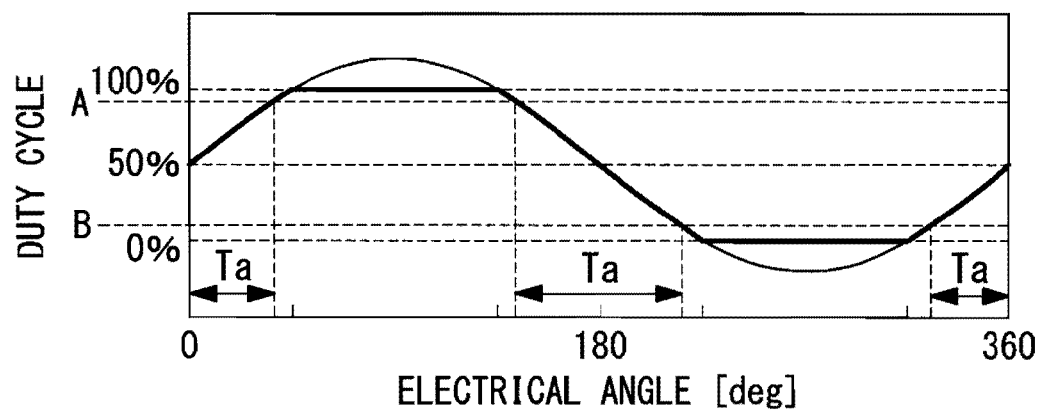
FIG. 9 is a diagram for describing a first period.

Furthermore, even during overmodulation control being performed, for example, it is possible that: in each of the first periods Ta in FIG. 9, the current calculation section 20 is employed to calculate a γ-axis current $i_γ$ and a δ-axis current $i_δ$; and in each of regions other than the first periods Ta, the current calculation section 11 is employed to calculate the γ-axis current $i_γ$ and the δ-axis current $i_δ$. Here, "first period Ta" refers to a period that is equal or lower than an upper limit A of a duty cycle that enables an inverter controller (for example, a CPU) to secure time necessary for detecting a current value and is equal to or higher than a lower limit B of the duty cycle that enables the inverter controller to secure time necessary for detecting a current value.

As described above, in one electrical angle cycle, switching between the current calculation section 11 and the current calculation section 20 is performed, whereby even if sharp load torque fluctuation occurs, it is possible to promptly follow changes in current value and current phase, enabling stable control to be performed.

The switching between the current calculation section 11 and the current calculation section 20 may be performed only for the γ-axis current or only for the δ-axis current. For example, for the γ-axis current $i_γ$, a γ-axis current calculation section 112 in the current calculation section 11 may consistently be used without performing current calculation section switching. For example, if calculation methods for both the γ-axis current $i_γ$ and the δ-axis current $i_δ$ are switched to the other at a time, calculated values may fluctuate before and after the switching. Accordingly, a same procedure is consistently used for calculation of either of the γ-axis current $i_γ$ and the δ-axis current $i_δ$, enabling suppression of fluctuation in calculated value due to calculation procedure switching.

Third Embodiment

Figure 10:
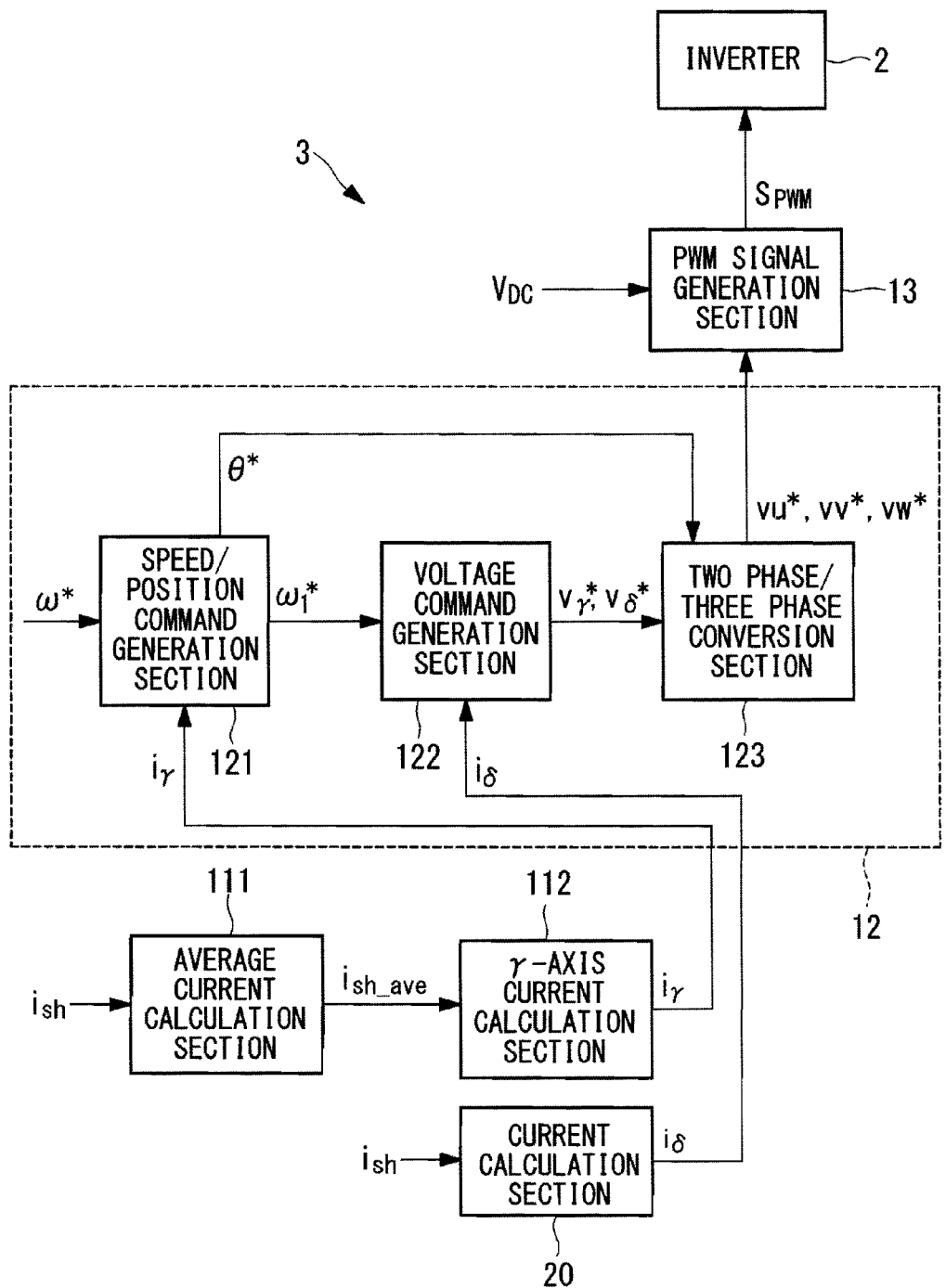
FIG. 10 is a block diagram illustrating a schematic configuration of an inverter apparatus according to a third embodiment of the present invention.

Next, an inverter apparatus according to a third embodiment of the present invention will be described. As illustrated in FIG. 10, the inverter apparatus according to the present embodiment includes a γ-axis current calculation section (a first current calculation section) 112 in a current calculation section 11, which has been described above (see FIG. 2), and a δ-axis current calculation function (a second current calculation section) in the current calculation section 20, and a γ-axis current calculated by the γ-axis current calculation section 112 and a δ-axis current calculated by the current calculation section 20 are output to a V/f control section 12.

In the inverter apparatus according to the present embodiment, during overmodulation control being performed, in each of first periods Ta, which is illustrated in FIG. 9, the γ-axis current calculated by the γ-axis current calculation section 112 and the δ-axis current calculated by the current calculation section 20 are output to the V/f control section 12.

Also, in each of periods other than the first periods Ta, the current calculation section 20 halts processing for calculating the δ-axis current and keeps the δ-axis current $i_δ$ calculated in the last first period Ta, and outputs the value of such δ-axis current $i_δ$ as the δ-axis current $i_δ$. In this case, also, the calculation of the γ-axis current by the γ-axis current calculation section 112 is continued.

As described above, in each of periods other than the first periods Ta, a value of the last δ-axis current $i_δ$ calculated in the relevant first period Ta is kept by the current calculation section 20 and calculation according to Expressions (3) to (5) above is performed by the V/f control section 12 using the value to calculate a γ-axis voltage command $v_γ^*$ and a δ-axis voltage command $v_δ^*$.

As described above, in each of periods other than the first periods Ta, in which it is likely that a δ-axis current $i_δ$ cannot be detected by the current calculation section 20, processing for calculation of a δ-axis current $i_δ$ by the current calculation section 20 is halted, enabling reduction in processing load on, and power consumption in, the inverter controller.

Although in the present embodiment, the current calculation section 20 is employed as a δ-axis current calculation means, the δ-axis current calculation section 113 illustrated in FIG. 2 may be employed instead. In this case, also in each of periods other than first periods Ta, processing for calculation of a δ-axis current $i_δ$ is halted, enabling reduction in processing load and power consumption.

Fourth Embodiment

Next, an inverter apparatus according to a fourth embodiment of the present invention will be described. Although in the above-described third embodiment, in each of periods other than first periods Ta during overmodulation control being performed, the last value is used as a δ-axis current, in the present embodiment, in each of periods other than the first periods Ta, δ-axis current calculation processing in a current calculation section 20 is halted and processing for calculation according to Expressions (4) and (5) in a V/f control section 12 is halted.

More specifically, the V/f control section 12 employs a fixed value, which is set in advance, as a δ-axis voltage command $v_δ^*$, and treats a value of $V_{ofsγ}$ in Expression (3) as being constant without performing calculation processing for Expression (5).

As described above, in each of periods other than the first periods Ta, the δ-axis current calculation processing is halted and calculation processing for Expression (4) and (5) in the V/f control section 12 is also halted, enabling simplification of arithmetic processing, whereby a processing load on a current calculation section 11 and the V/f control section 12 can be reduced.

Instead of the above aspect, for the δ-axis voltage command $v_δ^*$, it is possible to halt calculation processing using Expression (4) through a period in which overmodulation control is performed and employ a fixed value, which is set in advance.

REFERENCE SIGNS LIST

1 inverter apparatus
2 inverter
3 inverter controller
4 compressor motor
5 direct-current power supply
6 current sensor
8 voltage sensor
11 current calculation section
12 V/f control section
13 PWM signal generation section
20 current calculation section
111 average current calculation section
112 γ-axis current calculation section
113 δ-axis current calculation section
121 speed/position command generation section
122 voltage command generation section
123 two phase/three phase conversion section

The invention claimed is:

1. An inverter apparatus comprising:
    an inverter that converts a direct-current voltage input via a direct-current bus into three phase alternating voltages and outputs the three phase alternating voltages to a motor;
    an inverter control unit that controls the inverter; and
    a current detection unit that detects the direct current flowing in the direct-current bus,
    wherein the inverter control unit includes a first current calculation section that holds, in advance, a γ-axis current arithmetic expression including the direct current as a parameter, and calculates a γ-axis current using the direct current detected by the current detection unit for the γ-axis current arithmetic expression,
    wherein the inverter control unit comprises a second current calculation section that calculates three phase alternating currents from the direct current detected by the current detection unit and calculates a δ-axis current from the three phase alternating currents,
    wherein the inverter control unit comprises a V/f control section to which the γ-axis current calculated by the first current calculation section and the δ-axis current calculated by the second current calculation section are input; and
    wherein the V/f control section comprises
    a power supply frequency command calculation section that calculates a power supply frequency command using the γ-axis current and a speed command for the motor,
    a γ-axis voltage command calculation section that calculates a γ-axis voltage command using an arithmetic expression including an integral term of the δ-axis current and the power supply frequency command as parameters, and
    a δ-axis voltage command calculation section that calculates a δ-axis voltage command using a linear function of the δ-axis current.

2. The inverter apparatus according to claim 1, wherein the γ-axis current arithmetic expression is an expression obtained by figuring out a relationship between an average direct current and the γ-axis current relative to a motor torque when a line voltage and a rotating shaft speed of a motor are changed, respectively, and deriving the expression from the relationship.

3. The inverter apparatus according to claim 1, wherein the second current calculation section calculates the δ-axis current from the three phase alternating currents in a first period in which a duty cycle is neither 100% nor 0% in one electrical angle cycle during overmodulation control being performed, and keeps the δ-axis current calculated last time in the first period and outputs the kept value as the δ-axis current in a period other than the first period.

4. The inverter apparatus according to claim 1, wherein in a period in which a duty cycle is either 100% or 0% in one electrical angle cycle during overmodulation control being performed,
    the second current calculation section halts processing for calculating the δ-axis current, and
    the γ-axis voltage command calculation section calculates the γ-axis voltage command using a fixed value set in advance in the integral term of the δ-axis current.

5. The inverter apparatus according to claim 1, wherein during overmodulation control being performed, the δ-axis voltage command calculation section outputs a fixed value set in advance as the δ-axis voltage command.

6. The inverter apparatus according to claim 1, wherein the inverter control unit comprises:
    a V/f control section to which the γ-axis current calculated by the first current calculation section is input, the V/f control section calculating a power supply frequency command using the γ-axis current and a speed command for the motor; and
    a third current calculation section that holds, in advance, a δ-axis current arithmetic expression including a line voltage and the power supply frequency command calculated in the V/f control section as parameters, and calculates a δ-axis current using an command value or a measurement value of the line voltage and the power supply frequency command calculated by the V/f control section for the δ-axis current arithmetic expression.

7. The inverter apparatus according to claim 6, wherein the δ-axis current arithmetic expression is an expression obtained by figuring out a relationship between the δ-axis current and a motor torque when the line voltage and a rotating shaft speed of the motor are changed, respectively, and deriving the expression from the relationship.

8. The inverter apparatus according to claim 6, comprising:
- a fourth current calculation section that calculates three phase alternating currents from the direct current detected by the current detection unit, and calculates a γ-axis current from the three phase alternating currents; and
- a second current calculation section that calculates a δ-axis current from the calculated three phase alternating currents,
- wherein in a period in which overmodulation control is performed, the γ-axis current is calculated by the first current calculation section and the δ-axis current is calculated by the third current calculation section, and in a period in which the overmodulation control is not performed, the γ-axis current is calculated by the fourth current calculation section and the δ-axis current is calculated by the second current calculation section.

9. The inverter apparatus according to claim 8, wherein in a first period in which a duty cycle is neither 100% nor 0% in one electrical angle cycle during overmodulation control being performed, the γ-axis current is calculated by the fourth current calculation section and the δ-axis current is calculated by the second current calculation section, and in a period other than the first period, the γ-axis current is calculated by the first current calculation section and the δ-axis current is calculated by the third current calculation section.

* * * * *